(12) United States Patent
Smith et al.

(10) Patent No.: US 11,182,175 B2
(45) Date of Patent: Nov. 23, 2021

(54) APPARATUS AND METHODS FOR WORKFLOW CAPTURE AND DISPLAY

(75) Inventors: Jeffrey John Smith, Raleigh, NC (US); David Thomas Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2063 days.

(21) Appl. No.: 12/233,248

(22) Filed: Sep. 18, 2008

(65) Prior Publication Data

US 2010/0070950 A1  Mar. 18, 2010

(51) Int. Cl.
*G06F 9/451* (2018.01)
*G06Q 10/00* (2012.01)

(52) U.S. Cl.
CPC .............. *G06F 9/451* (2018.02); *G06Q 10/00* (2013.01)

(58) Field of Classification Search
CPC ....................................................... G06F 9/451
See application file for complete search history.

(56) References Cited

U.S. PATENT DOCUMENTS

| | | | | |
|---|---|---|---|---|
| 5,386,552 A * | 1/1995 | Garney | ................. | G06F 9/4418 714/10 |
| 5,678,034 A | 10/1997 | Chew | | |
| 5,835,770 A * | 11/1998 | Shum | .................. | G06F 11/3466 379/457 |
| 5,960,173 A * | 9/1999 | Tang | ......................... | G06F 9/54 348/14.08 |
| 6,182,086 B1 * | 1/2001 | Lomet | ................. | G06F 11/1471 |
| 6,658,487 B1 * | 12/2003 | Smith | ..................... | G06F 9/542 719/316 |
| 6,778,596 B1 * | 8/2004 | Tzannes | ................ | H04L 1/0025 375/222 |
| 9,654,739 B1 * | 5/2017 | Mitchell | .............. | G06Q 10/109 |
| 2002/0054053 A1 * | 5/2002 | Naimi et al. | .................. | 345/700 |
| 2003/0002390 A1 | 1/2003 | Sellen et al. | | |
| 2004/0098664 A1 * | 5/2004 | Adelman | ............... | G06Q 99/00 715/201 |
| 2004/0223511 A1 * | 11/2004 | Tzannes | ................ | H04L 1/0025 370/464 |

(Continued)

FOREIGN PATENT DOCUMENTS

| | | | | | |
|---|---|---|---|---|---|
| AU | 5960173 A | * | 2/1975 | ............. | C01B 33/22 |
| JP | 5960173 B2 | * | 8/2016 | ............. | F25B 49/02 |
| WO | WO-0244963 A2 | * | 6/2002 | ........... | G06Q 10/087 |

OTHER PUBLICATIONS

IQ.IP.com search. (Year: 2021).*

(Continued)

*Primary Examiner* — Tan D Nguyen
(74) *Attorney, Agent, or Firm* — Kunzler Bean & Adamson

(57) ABSTRACT

The apparatus for workflow capture and display is provided with a plurality of modules configured to functionally execute the necessary steps of capturing task workflow information, storing the task workflow information captured by the capture module in a data storage device, retrieving a portion of the task workflow information from the data storage device in response to a first event, and presenting the task workflow information in response to a second event. These modules in the described embodiments include a capture module, a storage module, an assembly module, and a presentation module.

18 Claims, 7 Drawing Sheets

(56) References Cited

U.S. PATENT DOCUMENTS

| | | | |
|---|---|---|---|
| 2005/0027733 A1* | 2/2005 | Donahue | G06Q 10/00 |
| 2005/0278630 A1* | 12/2005 | Bracey | 715/704 |
| 2005/0278655 A1 | 12/2005 | Sims | |
| 2005/0278728 A1* | 12/2005 | Klementiev | G06F 9/45512 |
| | | | 719/328 |
| 2006/0074711 A1* | 4/2006 | Mahesh et al. | 705/2 |
| 2006/0111937 A1* | 5/2006 | Yarger et al. | 705/2 |
| 2006/0167950 A1* | 7/2006 | Vertes | G06F 11/3476 |
| 2006/0173888 A1 | 8/2006 | Narahara et al. | |
| 2006/0203006 A1* | 9/2006 | Georgeson | 345/619 |
| 2006/0218635 A1* | 9/2006 | Kramer et al. | 726/22 |
| 2006/0256083 A1* | 11/2006 | Rosenberg | 345/156 |
| 2007/0011334 A1* | 1/2007 | Higgins | G06F 8/34 |
| | | | 709/227 |
| 2007/0067373 A1* | 3/2007 | Higgins | G06F 11/3013 |
| 2007/0078625 A1* | 4/2007 | Murphy et al. | 702/176 |
| 2007/0106633 A1* | 5/2007 | Reiner | 707/1 |
| 2007/0143736 A1* | 6/2007 | Moriarty et al. | 717/100 |
| 2007/0150327 A1* | 6/2007 | Dromgold | 705/8 |
| 2007/0174407 A1* | 7/2007 | Chen | G06Q 10/10 |
| | | | 709/207 |
| 2007/0186176 A1 | 8/2007 | Godley | |
| 2007/0220494 A1* | 9/2007 | Spooner | G06F 8/30 |
| | | | 717/130 |
| 2008/0201299 A1* | 8/2008 | Lehikoinen | G06F 16/48 |
| 2008/0229307 A1* | 9/2008 | Maeda et al. | 718/100 |
| 2008/0243898 A1* | 10/2008 | Gormish et al. | 707/102 |
| 2008/0277782 A1* | 11/2008 | Chen | H01L 23/5388 |
| | | | 257/724 |
| 2008/0288956 A1* | 11/2008 | Videlov | 719/313 |
| 2009/0184849 A1* | 7/2009 | Nasiri | G06F 3/0346 |
| | | | 341/20 |
| 2009/0192970 A1* | 7/2009 | O'Sullivan | G06F 17/211 |
| | | | 706/48 |
| 2009/0193298 A1* | 7/2009 | Mukherjee | G06F 11/0718 |
| | | | 714/38.1 |
| 2009/0287962 A1* | 11/2009 | Bakekolo | G06F 11/079 |
| | | | 714/38.14 |
| 2010/0070950 A1* | 3/2010 | Smith | G06F 9/451 |
| | | | 717/127 |
| 2011/0145838 A1* | 6/2011 | de Melo | G06F 11/3466 |
| | | | 719/318 |
| 2015/0234571 A1* | 8/2015 | Lee | G06F 3/04847 |
| | | | 715/721 |
| 2016/0294557 A1* | 10/2016 | Baldwin | G06K 9/00926 |

OTHER PUBLICATIONS

GoogleScholar search. (Year: 2021).*

Pirklbauer, G. "An Integration-Oriented Model For Application Lifecycle Management", 2009, pp. 399-402. (Year: 2009).*

Arshad, Naveed, "A Planning-Based Approach to Failure Recovery in Distributed Systems", A thesis submitted to the Faculty of The Graduate School of the University of Colorado, 2006, pp. 1-10. (Year: 2006).*

* cited by examiner

APPARATUS AND METHODS FOR WORKFLOW CAPTURE AND DISPLAY

BACKGROUND OF THE INVENTION

Field of the Invention

This invention relates to operation of a computer and more particularly relates to workflow capture, display, and task reversion.

Description of the Related Art

Most people use computers to accomplish specific tasks. For example, it is very common to use computers in a work environment. Unfortunately, it is often difficult to maintain focus while working on a computer, because they are also becoming a primary mode of communication. Interruptions may occur in the form of a received e-mail, instant message (commonly referred to as "chat"), Voice Over Internet Protocol (VoIP) telephone call, and other reminders and notices which may be generated by the computer or others in communication with the computer. Other interruptions may distract computer users from their specific tasks, including coworker interruptions, telephone calls, scheduled meetings, and the like.

Furthermore, people often use their computer to respond to the interruption either directly through communication applications, or indirectly by opening documents or applications to respond to questions, print documents, etc. In the process, many additional software application windows may be opened and certain application windows may be inadvertently closed. Consequently, many computer users require substantial amounts of time to remember: first, their original though processes, and second, which applications or documents were open prior to the interruption.

SUMMARY OF THE INVENTION

From the foregoing discussion, it should be apparent that a need exists for an apparatus and methods for workflow capture and display. Beneficially, such an apparatus and methods would capture workflow information, assemble the workflow information, and display the workflow information in a way that enables the computer user to remember his or her workflow prior to an interruption.

The apparatus for workflow capture and display is provided with a plurality of modules configured to functionally execute the necessary steps of capturing task workflow information, storing the task workflow information captured by the capture module in a data storage device, retrieving a portion of the task workflow information from the data storage device in response to a first event, and presenting the task workflow information in response to a second event. These modules in the described embodiments include a capture module, a storage module, an assembly module, and a presentation module.

In a further embodiment, the assembly module includes a tag module, the tag module configured to assign a tag to a portion of the task workflow information in response to the first event, wherein the tag defines the portion of the workflow information to be retrieved from the data storage device. The task workflow information may further comprise an image associated with a display device at a specified time. In a further embodiment, the task workflow information further comprises application information, the application information configured to indicate a software application in use at a specified time.

The presentation module may further include a reversion module configured to automatically configure a task bar to a captured task bar configuration in response to a reversion event, the captured task bar configuration defined by the application information. The reversion module may open a first software application specified in a portion of the application information defined by the first event in response to a determination that the first software application is not open at the time of the reversion event. In a further embodiment, the reversion module may save data associated with a second software application in response to a determination that the second software application was not open at the time of the first event, and close the second software application in response to a determination that the second software application was not open at the time of the first event.

Methods of the present invention are also presented for workflow capture and display. The methods in the disclosed embodiments substantially include the steps necessary to carry out the functions presented above with respect to the operation of the described apparatus. In one embodiment, the method includes capturing task workflow information, storing the task workflow information captured by the capture operation in a data storage device, retrieving a portion of the task workflow information from the data storage device in response to a first event, and presenting the task workflow information in response to a second event.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
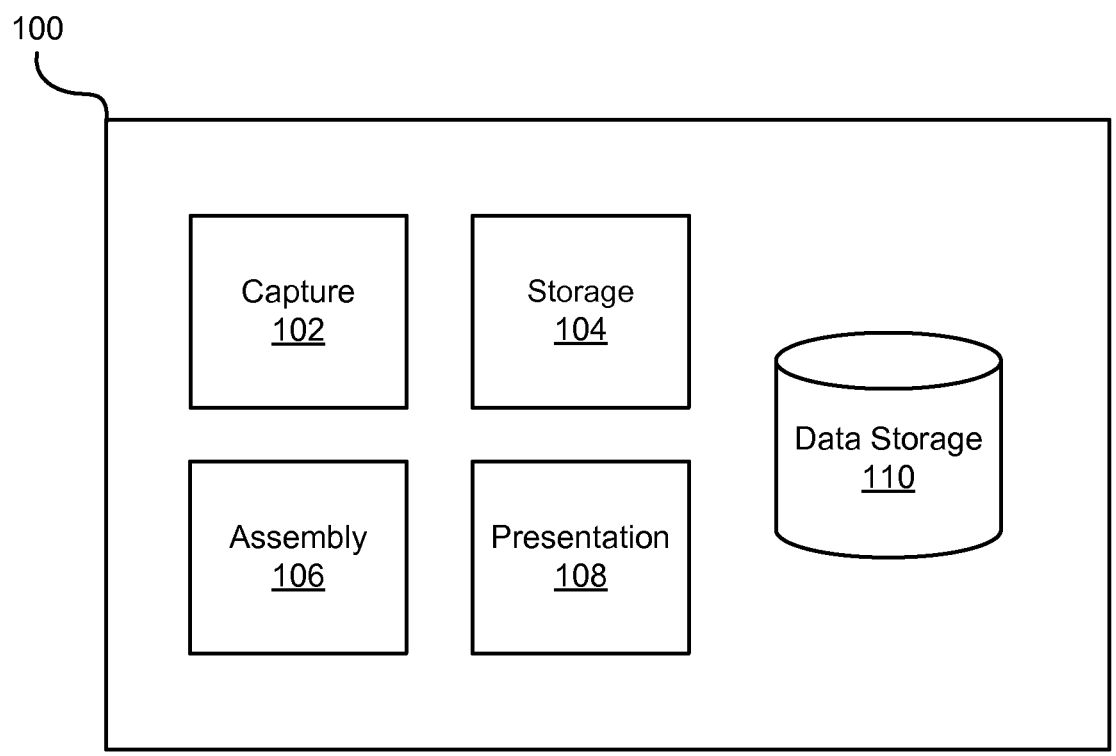
FIG. 1 is a schematic block diagram illustrating one embodiment of an apparatus for workflow capture and display.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different data storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Referring now to FIG. 1, the apparatus 100 may include a capture module 102, a storage module 104, an assembly module 106, a presentation module 108, and a data storage device 110.

The capture module 102 may capture task workflow information. For example, the capture module 102 may capture an image or stream of images associated with the display of a computer or a mobile telephone or computing device, such as a Personal Digital Assistant (PDA), at a specified time. In one embodiment, the capture module may continuously capture screen shots or streaming video of the images displayed on a display device such as a computer monitor. The images or video may be associated with time data. In a particular embodiment, the capture module may be coupled to a display device such as a monitor, a Liquid Crystal Display (LCD) screen controller, a graphics card, or a connector such as a Video Graphics Array (VGA) connector. In a further embodiment, the capture module 102 may interface with a processor (not shown) to determine which software applications are running at a specified time, and what state the applications are running in at that time. This type of workflow information is referred to herein as application information.

In one embodiment, the storage module 104 may store the task workflow information captured by the capture module in a data storage device 110. In a further embodiment, the storage module 104 may include the storage device 110. The storage module may include a memory controller, a hard disk controller, or the like. In a particular embodiment, the storage device 104 may be coupled to the capture module 102 by a data bus. The storage module 104 may store images, video, application data, and the like.

The assembly module 106 may retrieve a portion of the task workflow information from the data storage device 110 in response to a first event. The first event may include an interruption such as an incoming message on an instant messaging application, an incoming telephone call, a VoIP phone call, a scheduled calendar event such as a meeting, or the like. Alternatively, the first event may include a user initiated action, such as a specified key stroke, a mouse click over a portion of a graphical user interface associated with the assembly module 106, or the like.

For example, a computer or PDA user may initiate a software application associated with the apparatus 100. The software application may perform certain functions associated with the capture module 102, the storage module 104, the assembly module 106, and/or the presentation module 108 respectively. In such an embodiment, the computer user may set a predetermined key stroke or "hot key," and designate that as an indication of the first event. In this example, the capture module 102 may continuously capture screen-shots of the images being displayed on the computer user's monitor device, and the storage module 104 may continuously store the images in the data storage. In this example, the computer user may strike the designated hot key (e.g., "ctrl" plus "I") upon receiving a telephone call or some other interruption. The hot key indicates an interruption and signifies the first event.

In one embodiment, the portion of the task workflow information to be retrieved by the assembly module 106 is predetermined. For example, a user may specify that the assembly module 106 is only to assemble thirty (30) seconds of video or images for presentation. In such an embodiment, the assembly module 106 may only retrieve a portion of the task workflow information associated with thirty seconds of video or images. Alternatively, the assembly module 106 may request a user input to determine the portion of task workflow information to assemble. In still another embodiment, the assembly module 106 may retrieve an entire portion of the task workflow information, where the volume of information is restricted by allocations or availability of hardware (e.g., memory or hard disk) resources.

In one embodiment, the presentation module 108 may receive the assembled task workflow information from the assembly module 106 a present the information in response to a second event. For example, the second event may include a second key stroke or entry of a second hot key (e.g., "alt" plus "D"), or entry of a combination of keys on a mobile device (e.g., "*" plus "1"). Alternatively, the presentation module 108 may automatically display the task workflow information in response to a predetermined second event, such as a user closing a chat window or the like. The apparatus 100 may be configurable to provide flexible schemes for recognizing and responding to various user-defined first and second events.

The presentation module 108 may interface with a display device associated with a processing apparatus, such as a computer monitor or display screen, and present images, video, notes, or application data to the user identifying the user's workflow prior to the interruption. In one embodiment, the presentation module 108 may include a display portion of a graphical user interface window associated with a software application configured to perform certain functional operations of the apparatus 100. Alternatively, the presentation module 108 may present the task workflow information in full screen or some alternative user defined presentation format.

Figure 2:
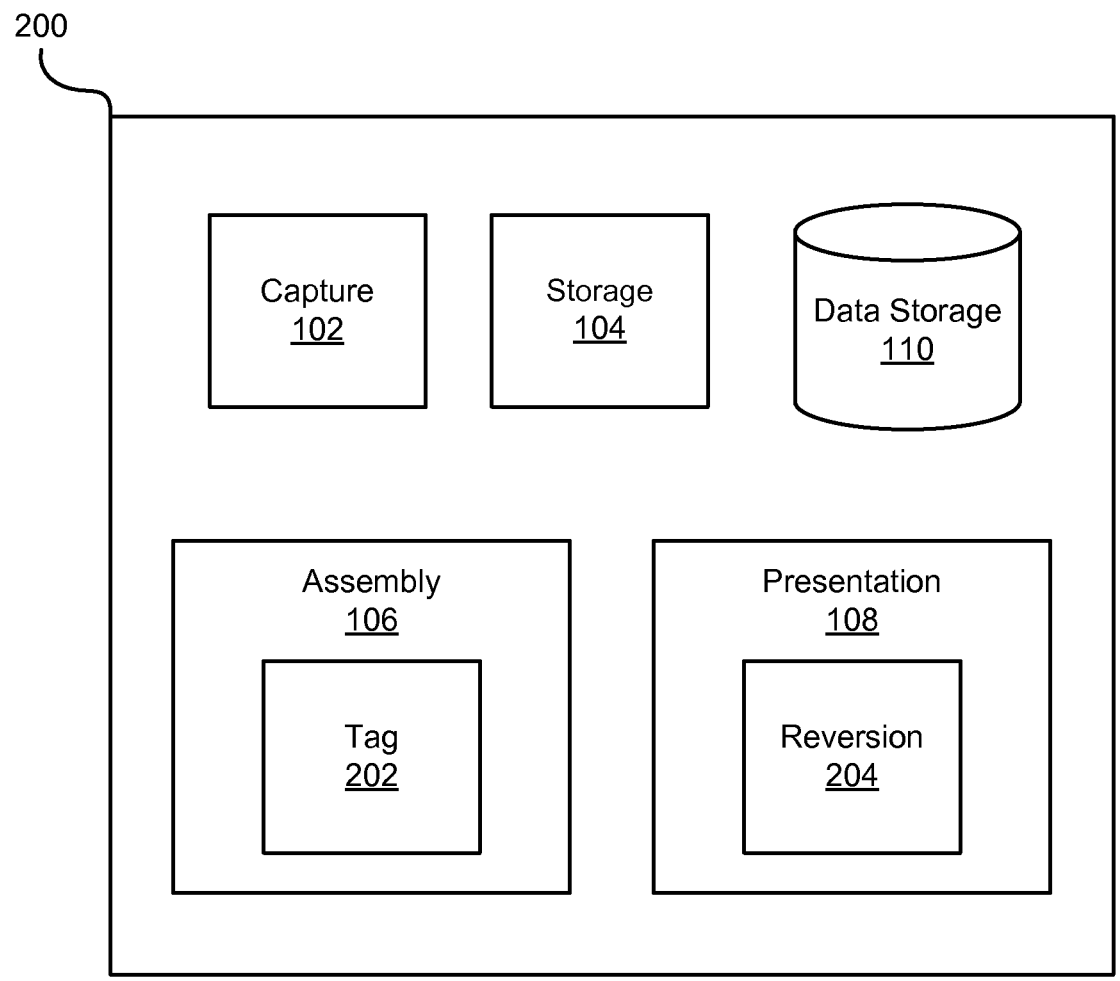
FIG. 2 is a detailed schematic block diagram illustrating one embodiment of an apparatus for workflow capture and display.

Referring now to FIG. 2, a second embodiment of an apparatus 200 may include substantially the same modules as described with reference to the apparatus 100 of FIG. 1; however, in the depicted embodiment, the assembly module 106 may include a tag module 202 and the presentation module 108 may include a reversion module 204.

The tag module 202 may assign a tag or indicator to a portion of the task workflow information in response to the first event. The tag may define the portion of the workflow information to be retrieved from the data storage device 110. For example, a tag may include a time-stamp, a flag, or an indicator. The tag may include a predetermined register value, where the register is associated with the data storage device 110.

As discussed above, the task workflow information may include application information. The application information may include a list of running applications, processes, or application windows. Additionally, the application information may include a task bar configuration. In a certain embodiment, the application information may include a table of processes, applications, windows, or task bar configurations cross-referenced according to a time value. In such an embodiment, the tag module 202 may flag a specified time value as a time at which a first event or a second event occurred. In such an embodiment, the tag module 202 may include a register containing a pointer to a position in the data storage device 110 associated with the time value.

The portion of the task workflow information to be assembled by the assembly module 106 may be determined with reference to the tagged or flagged time. For example, a thirty second segment of video may be assembled and presented, where the starting point is designated as the tagged time or location in the data storage device 110. Similarly, the reversion module 204 may reference the time tagged by the tag module 202 to determine a configuration to present.

In one embodiment, the reversion module 204 may automatically configure a task bar to a captured task bar configuration in response to a reversion event. In a specific embodiment, the reversion event may include the second event, and the captured task bar configuration may be referenced to a time tagged by the tag module 202, where the tagged time corresponds to the time of the first event. In various embodiments, the reversion module 204 may include an interface with the processor (not shown), a hard disk (not shown), and a memory device (not shown) to gather and store the application data associated with automatically configuring the task bar to the captured task bar configuration.

In one embodiment, the reversion module 204 may open a first software application specified in a portion of the application information defined by the first event in response to a determination that the first software application is not open at the time of the reversion event. The reversion module 204 may also save data associated with a second software application in response to a determination that the second software application was not open at the time of the first event. The reversion module 204 may further close the second software application in response to a determination that the second software application was not open at the time of the first event. Further examples of the operation of the reversion module 204 are discussed below with reference to FIGS. 5-7.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
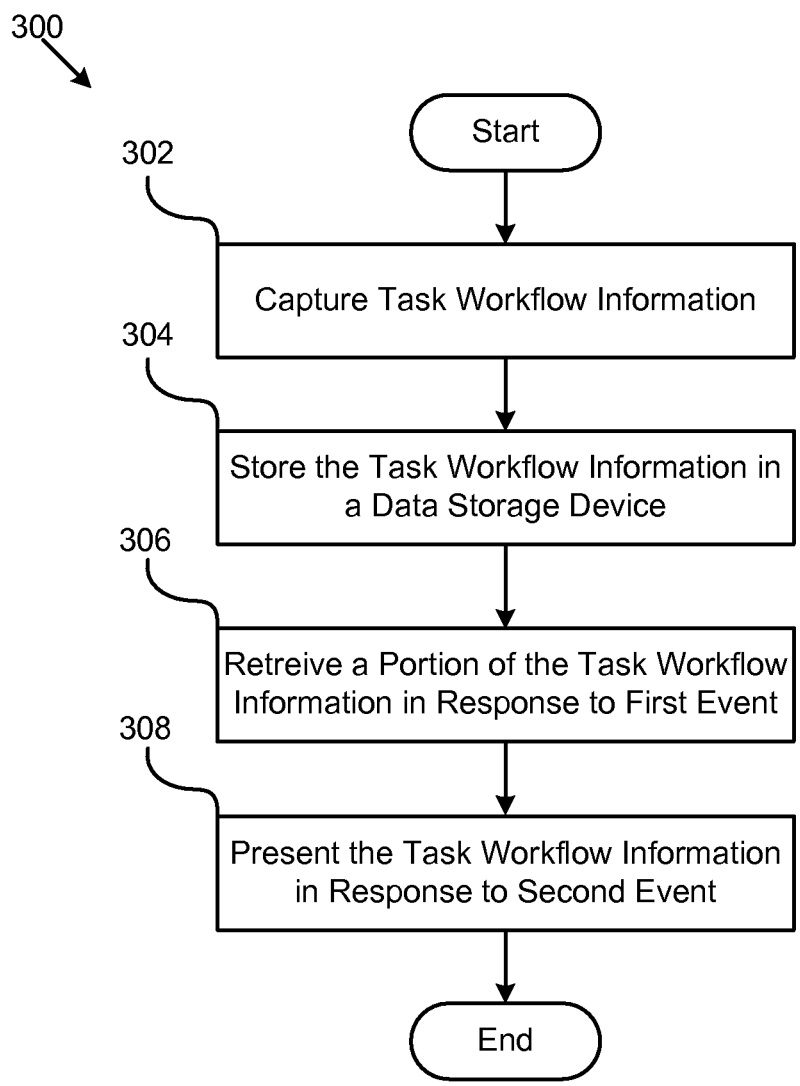
FIG. 3 is a schematic flowchart diagram illustrating one embodiment of a method for workflow capture and display.

FIG. 3 illustrates one embodiment of a method 300 for task workflow capture and presentation. In one embodiment, the method 300 starts when the capture module 102 captures 302 task workflow information. The storage module 104 may then store 304 the task workflow information in a data storage device 110. The assembly module 106 may then retrieve 306 a portion of the task workflow information in response to a first event. In a further embodiment, the presentation module 108 may then present 308 the task workflow information in response to a second event, and the method 300 ends.

Figure 4:
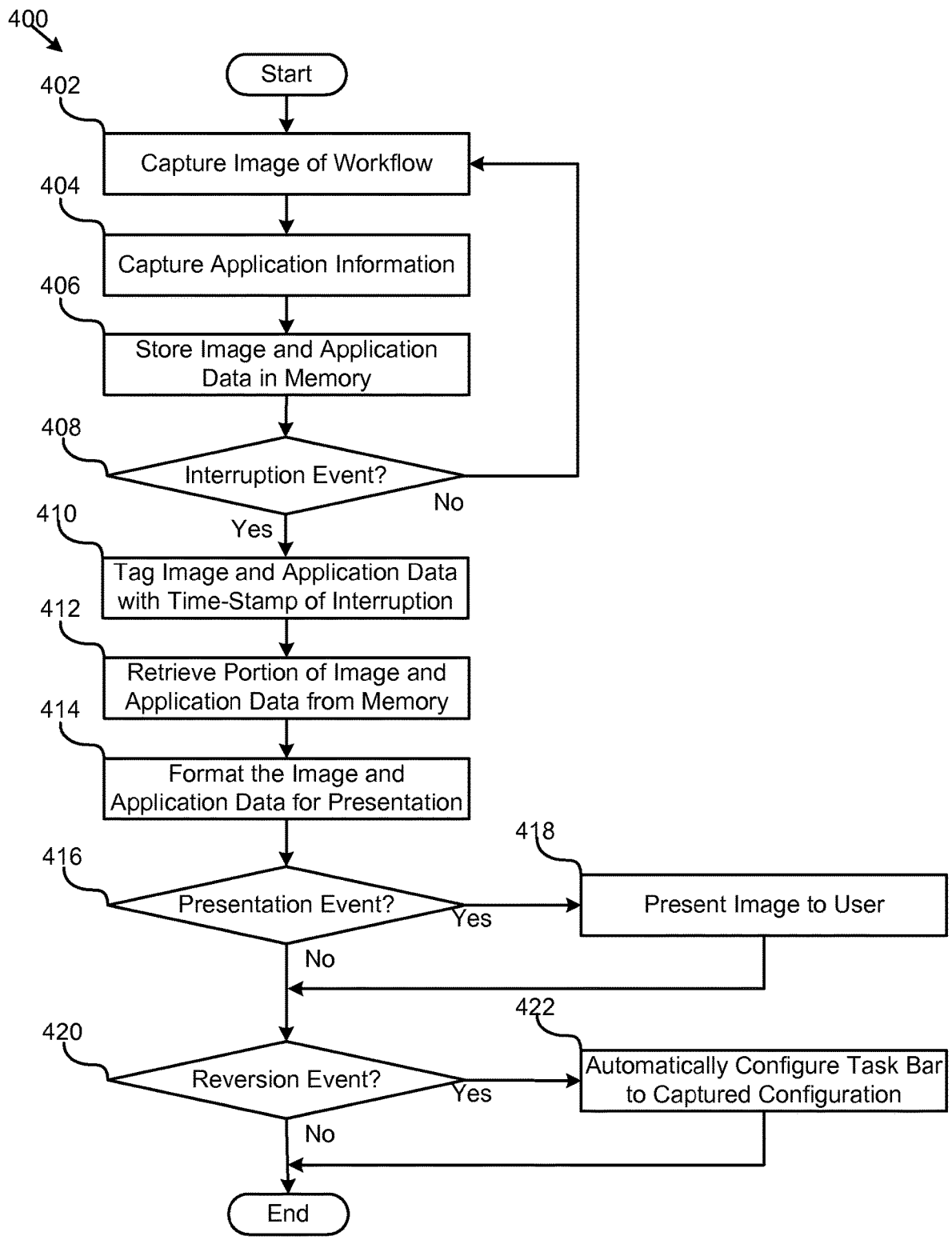
FIG. 4 is a detailed schematic flowchart diagram illustrating one embodiment of a method for workflow capture and display.

FIG. 4 illustrates a further embodiment. The method 400 of FIG. 4 starts when the capture module 102 captures 402 an image of the workflow. The capture module 102 may additionally capture 404 application information. The storage module 104 may then store the image and the application information in a memory device 110. The assembly module 106 may continuously monitor the system to identify 408 a first event. In the depicted embodiment, the first event is an interruption event. If the assembly module 106 does not identify 408 an interruption event, the capture module 102 continues to capture 402, 404, the images and application information. Similarly, the storage module 104 may continue to store 406 the images and application information in memory 110.

If the assembly module 106 does identify 408 an interruption event, the tag module 202 may tag 410 the image and application information with a time-stamp associated with the time the interruption event was identified 408 by the assembly module 106. The assembly module 106 may then retrieve 412 a portion of the workflow information, including the images and application information from memory 110. In a further embodiment, the portion to be retrieved is determined with reference to the time-stamp. The assembly module 106 may additionally format 414 the image and application information for presentation by the presentation module 108.

The presentation module 108 may then monitor the computer system to identify 416 a presentation event or to identify 420 a reversion event. If the presentation module 108 does identify 418 a presentation event, the presentation module 108 may present the image to the user. If no presentation event is identified 416 the presentation module 108 may continue to monitor the system.

If the presentation module 108 identifies 420 a reversion event, the reversion module 204 may automatically configure 422 the task bar to a captured task bar configuration. As illustrated below, the reversion module 204 may open a first software application specified in a portion of the application information defined by the first event in response to a determination that the first software application is not open at the time of the reversion event. The reversion module 204 may also save data associated with a second software application in response to a determination that the second software application was not open at the time of the first event. The reversion module 204 may further close the second software application in response to a determination that the second software application was not open at the time of the first event.

Figure 5:
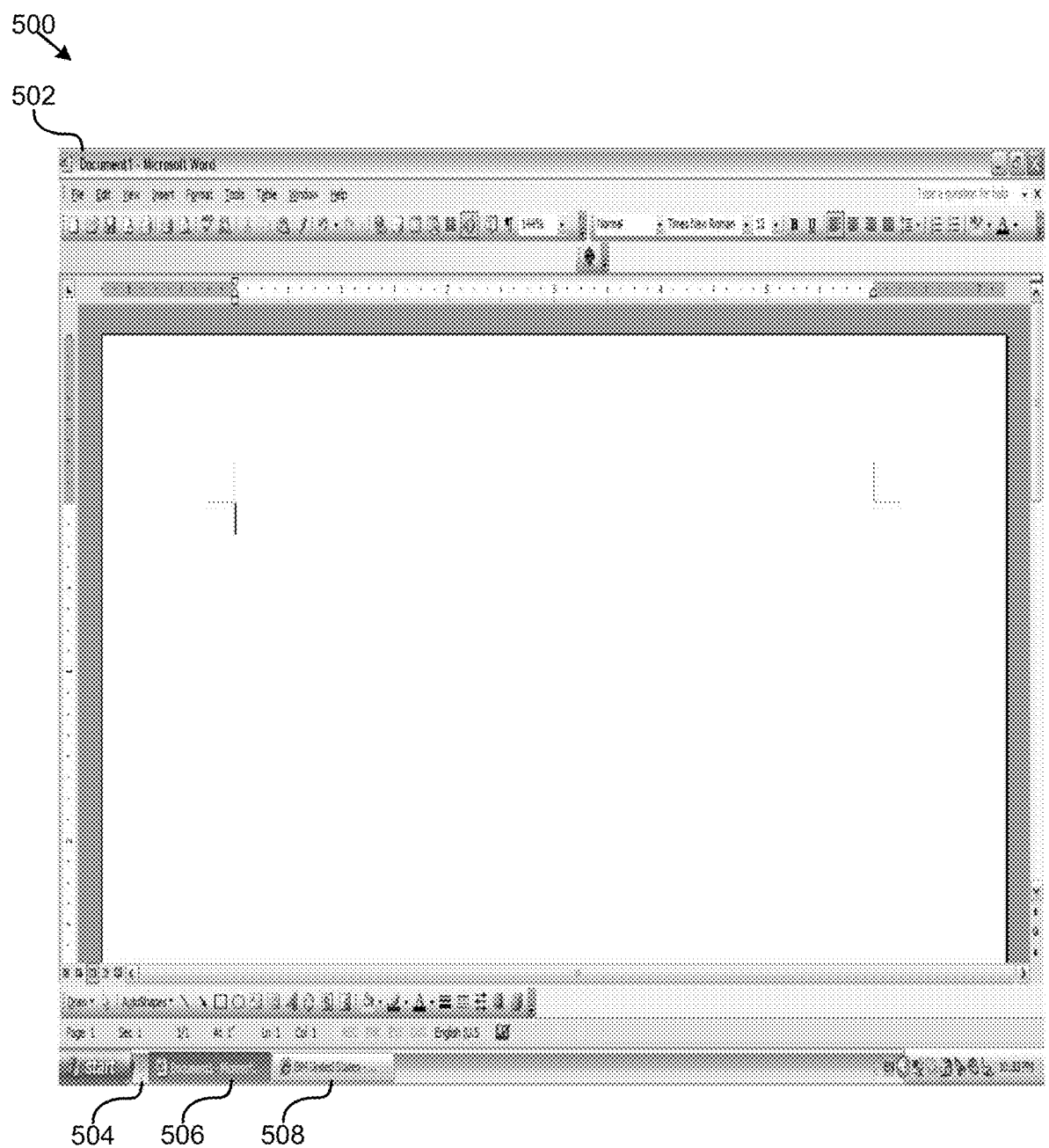
FIG. 5 is a screen-shot image illustrating one embodiment of an image representing workflow information before an interruption occurs.

By way of example, FIG. 5 illustrates one embodiment of task workflow information. In the depicted embodiment, the task workflow information includes a screen-shot image 500. The screen-shot image 500 shows an open window 502. Specifically, the open window 502 is a word processor window. The screen-shot image 500 also includes an image of the task bar 504. In this example, a first button 506 is associated with the word processor window 502 and a second button 508 associated with a web browser window (not shown). In a further embodiment, application information may be captured by the capture module 102 and stored by the storage module 104, including the application window 502 open at the time of the capture, and the buttons 506, 508 and associated applications present on the task bar 504.

Figure 6:
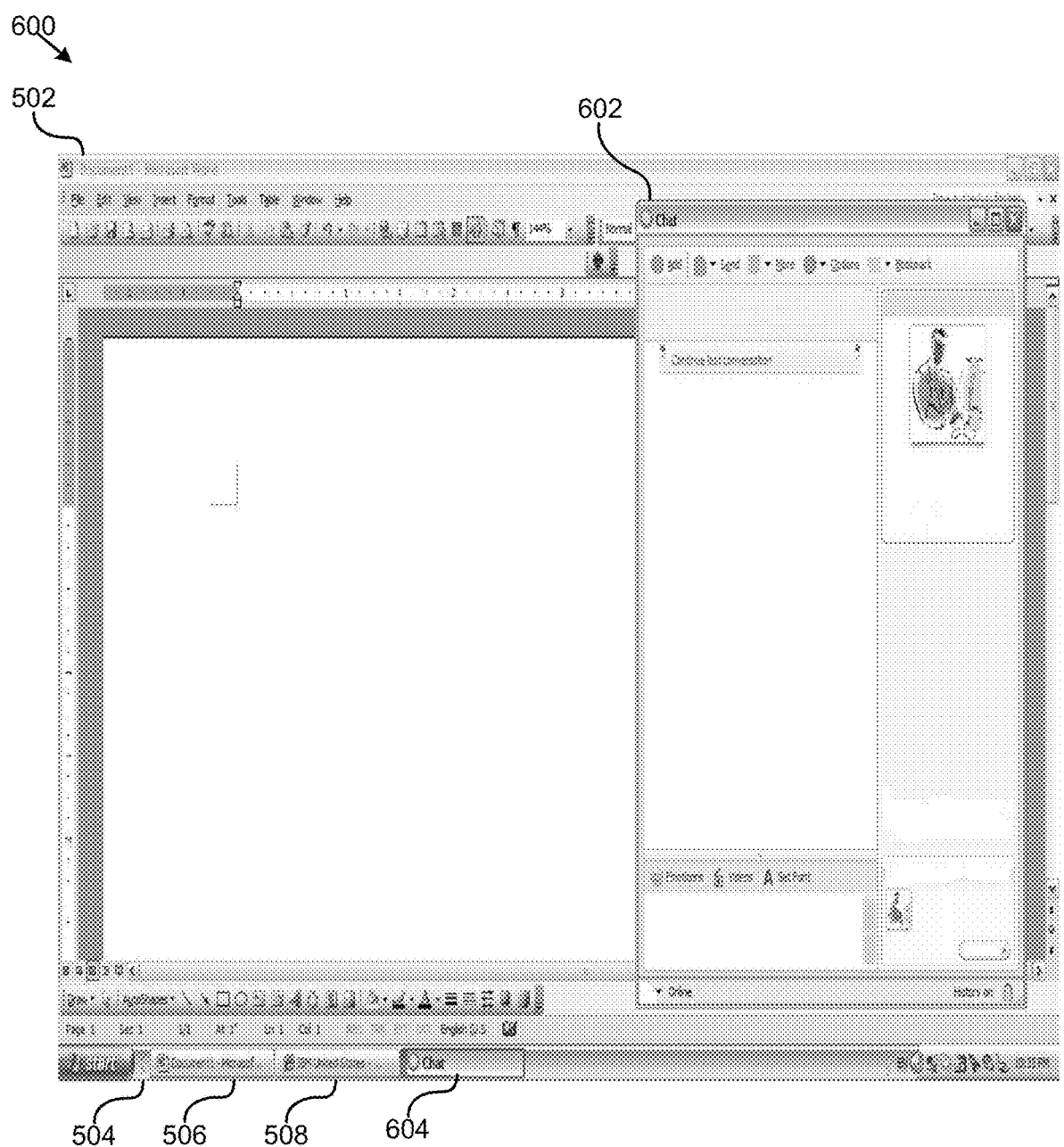
FIG. 6 is a screen-shot image illustrating one embodiment of an interruption.

FIG. 6 illustrates one embodiment of a first event, or interruption event. In the depicted embodiment, the first event includes a receipt of an incoming message over an instant messaging (chat) application. The chat application includes a pop-up window 602. In this example, the assembly module 106, and more particularly, the tag module 202 may tag the image 502 and the application information (not shown) with a time stamp associated with the time the chat window 602 appeared. As illustrated, the configuration of the task bar 504 is also modified by the interruption when the chat button 604 appears. Therefore, the assembly module 106 may also tag a portion of the application information associated with the interruption, so that the task bar 504 can be reverted to the configuration at, or just before, the time of the interruption.

Figure 7:
FIG. 7 is a screen-shot image illustrating a result of an interruption.

FIG. 7 illustrates an image of the potential results of the interruption. Often such interruptions lead computer users to open additional applications 728 and windows 722-726. Additionally, the configuration of the task bar 504 may be altered dramatically in response to the additional applications. For example, in the depicted embodiment, instead of the original word processing document 506 and web browser 508, the current configuration of the task bar 504 includes two system explore windows 704, five word processing windows 706, a drawing window 708, a spreadsheet window 710, five web browser windows 712, a calculator window 714, a command prompt window 716, and additional windows 718, 720.

In this example, the reversion module 204 may configure the task bar 504 to the original configuration as illustrated in FIG. 5, where only the word processing button 506 and the web browser button 508 appear. To accomplish this, the reversion module may save data associated with documents 706, 710, 718, or other applications that may include data that that requires saving such as the drawing programs 708, 720. The reversion module 204 may then reference the task bar configuration at the time of the interruption by referencing a tagged portion of the application information.

The reversion module 204 may then determine which application windows must be closed and which applications must be reopened to configure the task bar 504 to the original configuration, where original is referenced to the tagged time of the interruption. In such an embodiment, the reversion module 204 may then close certain windows 722, 724, 726, 728, and applications associated with various task bar buttons 704-720. Additionally, the reversion module 204 may reopen application windows associated with the applications that were open at the time of the interruption.

In effect, the reversion module 204 may automatically, or in response to a user command, revert the configuration of the task bar 504 to the configuration associated with the application information at the time of, or just before, the interruption. The result may include a configuration of the task bar that is substantially the same as the configuration illustrated in FIG. 5. In a further embodiment, the capture module 102 may capture the web address of the web browser window 508 so that the reversion module 204 may further configure the web browser to display the same web page.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to return a plurality of applications to a state they were in before an interruption occurs, comprising:
    making a plurality of software windows available to a user while a software application performs the following:
        collecting information about each running application of multiple applications running concurrently on a computing device used by the user at a time of a capture;
        in response to a first event that is an interruption event that interrupts the user using the computing device, capturing task workflow information that indicates an application state of each running application on the computing device used by the user at the time of the first event and storing the task workflow information in a data storage device;
        retrieving a portion of the task workflow information from the data storage device, wherein the portion of the task workflow information indicates the running applications used by the user at the time of the first event;
        returning, using the portion of the task workflow information, each running application on the computing device used by the user to the application state at the time of the first event in response to a second event representing an end of the interruption event, wherein returning each running application on the computing device used by the user to the application state at the time of the first event comprises: running each running application, and closing applications opened after the first event and before the second event; and
        opening a first software application specified in the portion of the task workflow information in response to a determination that the first software application is not open at the time of the second event, wherein the computing device operates the plurality of software applications comprising the plurality of software windows continuously between the first event and the second event.

2. The method of claim 1, further comprising assigning a tag to a portion of the task workflow information in response to the first event, wherein the tag defines the portion of the workflow information to be retrieve from the data storage device.

3. The method of claim 1, wherein the task workflow information further comprises an image associated with a display device at a specified time.

4. The method of claim 1, wherein the task workflow information further comprises application information, the application information indicating a software application in use at a specified time.

5. The method of claim 4, further comprising automatically configuring a task bar to a captured task bar configuration in response to a second event, the captured task bar configuration defined by the application information.

6. The method of claim 5, further comprising:
    saving data associated with a second software application in response to a determination that the second software application was not open at the time of the first event; and
    closing the second software application in response to a determination that the second software application was not open at the time of the first event.

7. A computer program product comprising a non-transitory computer readable storage medium having computer usable program code executable to perform operations for workflow capture and display to return a plurality of applications to a state they were in before an interruption occurs, the operations of the computer program product comprising:
    making a plurality of software windows available to a user while a software application performs the following:
        collecting information about each running application of multiple applications running concurrently on a computing device used by the user at a time of a capture;
        in response to a first event that is an interruption event that interrupts the user using the computing device, capturing task workflow information that indicates an application state of each running application on the computing device used by the user at the time of the first event and storing the task workflow information in a data storage device;
        retrieving a portion of the task workflow information from the data storage device, wherein the portion of the task workflow information indicates the running applications used by the user at the time of the first event;
        returning, using the portion of the task workflow information, each running application on the computing device used by the user to the application state at the time of the first event in response to a second event representing an end of the interruption event, wherein returning each running application on the computing device used by the user to the application state at the time of the first event comprises: running each running application, and closing applications opened after the first event and before the second event; and
        opening a first software application specified in the portion of the task workflow information in response to a determination that the first software application is not open at the time of the second event, wherein the computing device operates the plurality of software applications comprising the plurality of software windows continuously between the first event and the second event.

8. The computer program product of claim 7, wherein the operations further comprise assigning a tag to a portion of the task workflow information in response to the first event, wherein the tag defines the portion of the workflow information to be retrieve from the data storage device.

9. The computer program product of claim 7, wherein the task workflow information further comprises an image associated with a display device at a specified time.

10. The computer program product of claim 7, wherein the task workflow information further comprises application information, the application information indicating a software application in use at a specified time.

11. The computer program product of claim 10, wherein the operations further comprise automatically configuring a task bar to a captured task bar configuration in response to the second event, the captured task bar configuration defined by the application information.

12. The computer program product of claim 11, wherein the operations further comprise:
    saving data associated with a second software application in response to a determination that the second software application was not open at the time of the first event; and closing the second software application in response to a determination that the second software application was not open at the time of the first event.

13. A computing device comprising a processor, the computing device used to return a plurality of applications to a state they were in before an interruption occurs, the computing device further comprising:
  a plurality of software windows available to a user while a software application comprising a capture module, a storage module, an assembly module, and a reversion module performs a plurality of operations, wherein:
    the capture module collects information about each running application of multiple user applications being run concurrently on the computing device and captures task workflow information that indicates an application state of each of the running application on the computing device used by the user at a time of the capture, wherein the task workflow information is captured in response to a first event that is an interruption event that interrupts the user using the computing device;
    the storage module stores the task workflow information captured by the capture module in a data storage device;
    the assembly module retrieves a portion of the task workflow information from the data storage device, wherein the portion of the task workflow information indicates the running applications used by the user at the time of the first event; and
    the reversion module returns, using the portion of the task workflow information, each running application on the computing device used by the user to the application state at the time of the first event in response to a second event representing an end of the interruption event and to open a first software application specified in the portion of the task workflow information in response to a determination that the first software application is not open at the time of the second event, wherein returning each running application on the computing device used by the user to the application state at the time of the first event comprises: running each running application, and closing applications opened after the first event and before the second event;
    wherein the computing device operates the plurality of software applications comprising the plurality of software windows continuously between the first event and the second event.

14. The computing device of claim 13, wherein the assembly module further comprises a tag module, the tag module configured to assign a tag to a portion of the task workflow information in response to the first event, wherein the tag defines the portion of the workflow information to be retrieve from the data storage device.

15. The computing device of claim 13, wherein the task workflow information further comprises an image associated with a display device at a specified time.

16. The computing device of claim 13, wherein the task workflow information further comprises application information, the application information indicating a software application in use at a specified time.

17. The computing device of claim 16, wherein the reversion module is configured to automatically configure a task bar to a captured task bar configuration in response to the second event, the captured task bar configuration defined by the application information.

18. The computing device of claim 17, wherein the reversion module is further configured to:
  save data associated with a second software application in response to a determination that the second software application was not open at the time of the first event; and
  close the second software application in response to a determination that the second software application was not open at the time of the first event.

* * * * *